US011802606B2

United States Patent
Aston et al.

(10) Patent No.: US 11,802,606 B2
(45) Date of Patent: Oct. 31, 2023

(54) PLANATE DYNAMIC ISOLATOR

(71) Applicant: The Boeing Company, Chicago, IL (US)

(72) Inventors: Richard W. Aston, Brea, CA (US); Matthew Joseph Herrmann, Rancho Palos Verdes, CA (US); Christopher David Joe, Arcadia, CA (US); Manav Hemal Sanghvi, Hermosa Beach, CA (US)

(73) Assignee: The Boeing Company, Arlington, VA (US)

( * ) Notice: Subject to any disclaimer, the term of this patent is extended or adjusted under 35 U.S.C. 154(b) by 512 days.

(21) Appl. No.: 16/877,480

(22) Filed: May 18, 2020

(65) Prior Publication Data

US 2021/0356015 A1    Nov. 18, 2021

(51) Int. Cl.
*B64G 1/64* (2006.01)
*F16F 15/08* (2006.01)
(Continued)

(52) U.S. Cl.
CPC .............. *F16F 15/08* (2013.01); *B64G 1/641* (2013.01); *B64G 1/645* (2013.01); *F16M 13/02* (2013.01); *B64G 2001/228* (2013.01)

(58) Field of Classification Search
CPC ........ F16F 15/08; F16F 1/3732; B64G 1/641; B64G 1/645; B64G 2001/228; B64G 1/38; B64G 1/64; B64G 1/66
See application file for complete search history.

(56) References Cited

U.S. PATENT DOCUMENTS

| 3,976,269 A | 8/1976 | Gupta |
| 5,342,465 A | 8/1994 | Bronowicki et al. |

(Continued)

FOREIGN PATENT DOCUMENTS

| CA | 3023416 A1 | 1/2019 |
| CN | 106694884 A | 5/2017 |

(Continued)

OTHER PUBLICATIONS

Morrett, Robert, Sep. 10, 2015, "Selecting a filler metal: Seven factors to consider", Plant Engineering. https://www.plantengineering.com/articles/selecting-a-filler-metal-seven-factors-to-consider/ (Year: 2015).

(Continued)

*Primary Examiner* — Medhat Badawi
*Assistant Examiner* — Vicente Rodriguez
(74) *Attorney, Agent, or Firm* — Kolisch Hartwell, P.C.

(57) ABSTRACT

A vibration isolation system is disclosed, including a rigid retaining device having an internal space, a first external side, and a second external side. A rigid anchoring device is retained in the internal space of the rigid retaining device. The anchoring device has a linkage member that extends from the internal space to the first external side of the retaining device and is configured for rigid connection to a first apparatus. The second side of the retaining device is configured for attachment to a second apparatus. A damping material is sandwiched between the retaining device and the anchoring device, and is configured to limit transfer of vibration between the retaining device and the anchoring device.

20 Claims, 8 Drawing Sheets

(51) Int. Cl.
*F16M 13/02* (2006.01)
*B64G 1/22* (2006.01)

(56) References Cited

U.S. PATENT DOCUMENTS

| | | | |
|---|---|---|---|
| 6,064,352 A | 5/2000 | Silverman et al. | |
| 6,199,801 B1 | 3/2001 | Wilke et al. | |
| 6,206,327 B1 | 3/2001 | Benedetti et al. | |
| 6,207,256 B1 | 3/2001 | Tashiro | |
| 6,290,183 B1 | 9/2001 | Johnson et al. | |
| 6,343,770 B2 * | 2/2002 | Holemans | B64G 1/641 |
| | | | 285/82 |
| 7,249,756 B1 | 7/2007 | Wilke et al. | |
| 8,458,976 B2 | 6/2013 | Chen et al. | |
| 9,475,594 B2 * | 10/2016 | Barber | B64G 1/641 |
| 9,718,566 B2 | 8/2017 | Field et al. | |
| 9,796,486 B1 | 10/2017 | Illsley et al. | |
| 9,828,117 B2 * | 11/2017 | Echelman | B64G 1/645 |
| 10,392,135 B2 | 8/2019 | Smith et al. | |
| 10,407,189 B1 | 9/2019 | Freestone et al. | |
| 10,518,912 B2 * | 12/2019 | Arulf | B64G 1/002 |
| 10,536,107 B1 | 1/2020 | Ning et al. | |
| 10,538,347 B1 | 1/2020 | Turner et al. | |
| 10,556,710 B2 * | 2/2020 | Lancho Doncel | F16F 1/3732 |
| 10,895,015 B1 | 1/2021 | Schaedler | |
| 2004/0074206 A1 | 4/2004 | Tanase et al. | |
| 2006/0107611 A1 | 5/2006 | Merrifield | |
| 2006/0185277 A1 | 8/2006 | Quincieu | |
| 2011/0120080 A1 | 5/2011 | Schwark, Jr. et al. | |
| 2011/0296675 A1 | 12/2011 | Roopnarine et al. | |
| 2012/0112010 A1 * | 5/2012 | Young | B64G 1/641 |
| | | | 244/173.1 |
| 2012/0261515 A1 * | 10/2012 | Smith | B64G 1/64 |
| | | | 244/173.3 |
| 2013/0000247 A1 | 1/2013 | Sypeck | |
| 2014/0041231 A1 | 2/2014 | Andrews | |
| 2014/0131521 A1 | 5/2014 | Apland et al. | |
| 2014/0239125 A1 | 8/2014 | Aston et al. | |
| 2015/0048209 A1 | 2/2015 | Hoyt et al. | |
| 2015/0175210 A1 | 6/2015 | Raymond | |
| 2015/0298423 A1 | 10/2015 | Holemans | |
| 2016/0031572 A1 | 2/2016 | Dube | |
| 2016/0237836 A1 | 8/2016 | Harris | |
| 2016/0282067 A1 | 9/2016 | Aston et al. | |
| 2016/0288926 A1 | 10/2016 | Smith et al. | |
| 2016/0325520 A1 | 11/2016 | Berger | |
| 2016/0340061 A1 | 11/2016 | Bose et al. | |
| 2017/0036783 A1 | 2/2017 | Snyder | |
| 2018/0106564 A1 | 4/2018 | Isaacs et al. | |
| 2018/0194096 A1 | 7/2018 | Martial Somda et al. | |
| 2018/0194494 A1 | 7/2018 | Dube | |
| 2018/0223947 A1 * | 8/2018 | Shepard | F16F 3/04 |
| 2018/0229443 A1 | 8/2018 | Pham et al. | |
| 2018/0251238 A1 | 9/2018 | Cherrette | |
| 2018/0251241 A1 | 9/2018 | Burt | |
| 2018/0281339 A1 | 10/2018 | Hull et al. | |
| 2019/0023423 A1 | 1/2019 | Grubler et al. | |
| 2019/0202163 A1 | 7/2019 | Yeh et al. | |
| 2019/0315501 A1 | 10/2019 | Duong et al. | |
| 2019/0337220 A1 | 11/2019 | Beyerle et al. | |
| 2020/0010220 A1 | 1/2020 | Fraze | |
| 2021/0061495 A1 | 3/2021 | Aston et al. | |
| 2021/0221540 A1 | 7/2021 | Panetti et al. | |
| 2021/0354856 A1 | 11/2021 | Aston et al. | |
| 2021/0354859 A1 | 11/2021 | Aston et al. | |

FOREIGN PATENT DOCUMENTS

| | | |
|---|---|---|
| CN | 208392799 U | 1/2019 |
| CN | 109317677 A | 2/2019 |
| CN | 111532452 A | 8/2020 |
| EP | 0780294 A1 | 6/1997 |
| EP | 3034208 A1 | 6/2016 |
| EP | 3333474 A1 | 10/2017 |
| EP | 3569396 A1 | 11/2019 |
| EP | 3785828 A1 | 3/2021 |
| WO | 2017169080 A1 | 10/2017 |

OTHER PUBLICATIONS

U.S. Patent and Trademark Office, Final Office Action regarding U.S. Appl. No. 16/554,150, dated May 31, 2022, 19 pages.
U.S. Patent and Trademark Office, Non-Final Office Action regarding U.S. Appl. No. 16/554,150, dated Oct. 4, 2022, 27 pages.
European Patent Office, Extended European Search Report regarding European Patent Application No. 21168773.6, dated Oct. 19, 2021, 9 pages.
European Patent Office, Extended European Search Report regarding European Patent Application No. 21168768.6, dated Oct. 19, 2021, 11 pages.
Zhang, Xiaoyu et al. "Vibration tests of 3D printed satellite structure made of lattice sandwich panels." AIAA Journal 56.10 (Oct. 1, 2018): 4213-4217.
European Patent Office, Extended European Search Report regarding European Patent Application No. 20189687.5, dated Feb. 1, 2021, 11 pages.
U.S. Patent and Trademark Office, Non-Final Office Action regarding U.S. Appl. No. 16/877,477, dated Apr. 14, 2022, 31 pages.
Mauduit et al., Study of the Suitability of Aluminum Alloys for Additive Manufacturing by Laser Powder Bed Fusion, U.P.B. Sci. Bull., Series B. vol. 79, Iss. 4, 2017, 22 pages.
U.S. Patent and Trademark Office, Non-Final Office Action regarding U.S. Appl. No. 16/877,474, dated Sep. 7, 2022, 49 pages.
European Patent Office, Extended European Search Report regarding European Patent Application No. 21214774.8, dated Apr. 21, 2022, 7 pages.
European Patent Office, Extended European Search Report regarding European Patent Application No. 21214809.2, dated Apr. 25, 2022, 9 pages.
Planetary Systems Corporation, "2000785G Mkll MLB User Manual," Jul. 24, 2018, 94 pages, Planetary Systems Corporation, Silver Spring, Maryland.
U.S. Patent and Trademark Office, Final Office Action regarding U.S. Appl. No. 16/877,474, dated Mar. 15, 2023, 20 pages.
U.S. Patent and Trademark Office, Final Office Action regarding U.S. Appl. No. 16/554,150, dated Mar. 27, 2023, 19 pages.
European Patent Office, Examination Report regarding European Patent Application No. 21168768.6, dated Mar. 28, 2023, 7 pages.
U.S. Patent and Trademark Office, Non-Final Office Action regarding U.S. Appl. No. 17/553,628, dated Jan. 24, 2023, 47 pages.

* cited by examiner

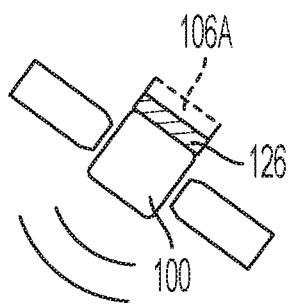 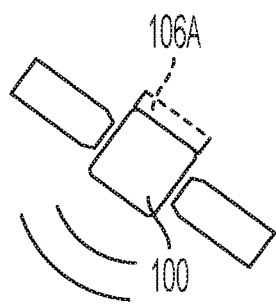
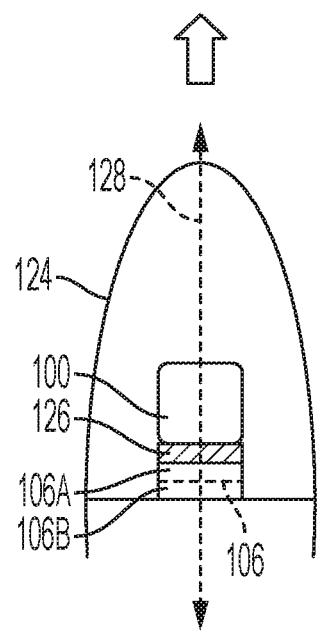 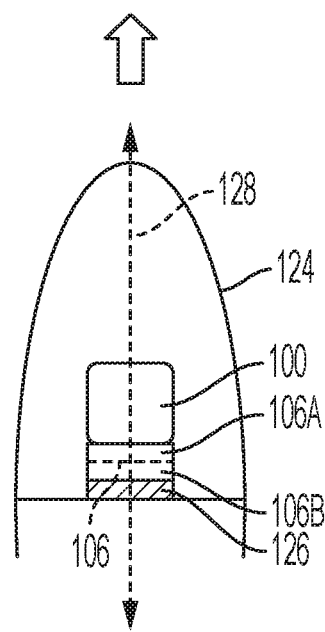
FIG. 3A FIG. 3B

PLANATE DYNAMIC ISOLATOR

BACKGROUND

Vibrations are a common undesirable byproduct of many mechanical systems, and can be particularly detrimental in the launch of spacecraft such as satellites. Propagating in mechanical waves, the vibrations may be transmitted from a rocket powered launch vehicle to the spacecraft, where they may have adverse effects on delicate equipment.

Transmission of damaging vibration may be limited by inherent damping of the spacecraft, or by directly protecting susceptible equipment. In cases where such options are insufficient or impractical, an active or a passive vibration isolator may be used. In general, each vibration isolator is limited in the amplitude and frequencies for which it is effective, and an isolator is often chosen or tuned for a specific application and the associated expected vibrations.

Many isolators, particularly those with moving parts, can be heavy and/or bulky and therefore impractical for launch with a spacecraft. Design of a spacecraft and a launch vehicle and/or separation system may also impose significant constraints on the strength and geometry of an isolator. A light-weight, low-profile isolator that is compatible with launch mount constraints and adaptable to expected loading characteristics is therefore desirable.

SUMMARY

The present disclosure provides systems, apparatus, and methods relating to vibration isolation. In some examples, a vibration isolation system may include a rigid retaining device having an internal space, a first external side, and a second external side. A rigid anchoring device may be retained in the internal space of the rigid retaining device. The anchoring device may have a linkage member that extends from the internal space to the first external side of the retaining device and is configured for rigid connection to a first apparatus. The second side of the retaining device may be configured for attachment to a second apparatus. A damping material may be sandwiched between the retaining device and the anchoring device, and may be configured to limit transfer of vibration between the retaining device and the anchoring device.

In some examples, a vibration isolation system for coupling a satellite to a launch vehicle may include a separation device and a vibration isolating assembly rigidly connected to the separation device. The separation device may be configured for carrying a satellite in a launch vehicle during a launch phase and releasing the satellite from the launch vehicle in space. The vibration isolating assembly may include a rigid retaining device having an internal space and a rigid anchoring device retained in the internal space of the rigid retaining device. A damping material may be sandwiched between the retaining device and the anchoring device, and may be configured to limit transfer of vibration between the launch vehicle and the separation device.

In some examples, a method of carrying a satellite to space may include coupling a dynamic isolator assembly to a separation device, and mounting a satellite to a carrier via the dynamic isolator and the separation device. The dynamic isolator assembly may include a retaining device having an internal space, an anchoring device retained in the internal space of the retaining device, and a damping material sandwiched between the retaining device and the anchoring device.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 3A is a schematic diagram of the satellite of FIG. 1, mounted to the launch vehicle with an illustrative vibration isolation system in a first configuration.

FIG. 3B is a schematic diagram of the satellite of FIG. 1, mounted to the launch vehicle with the illustrative vibration isolation system in a second configuration

DETAILED DESCRIPTION

Figure 1:
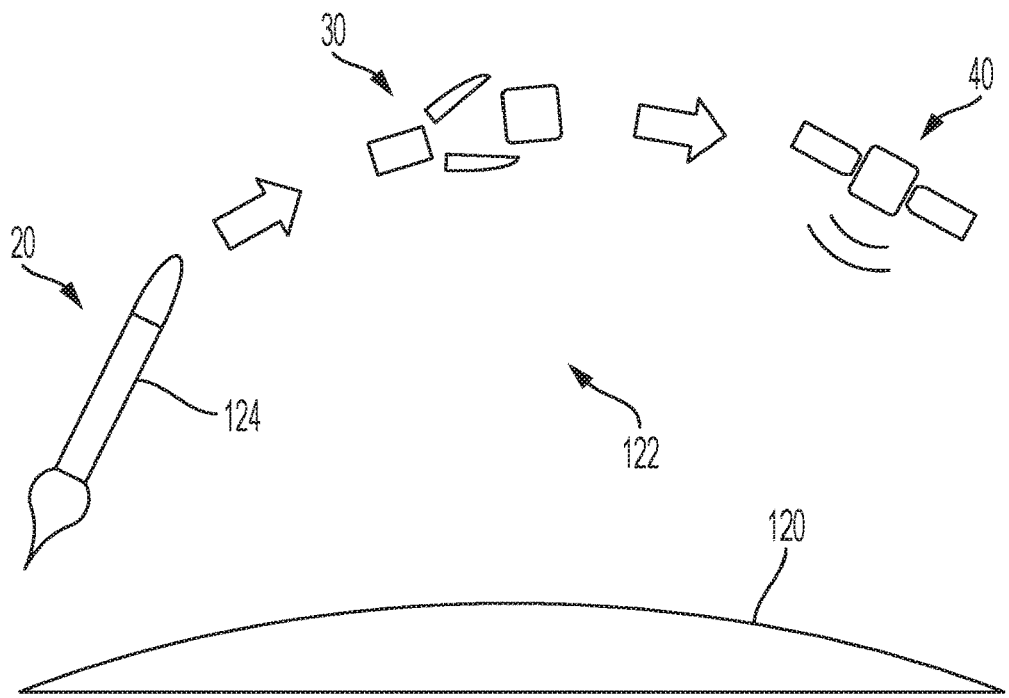
FIG. 1 is schematic diagram of an illustrative satellite in accordance with aspects of the present disclosure.

Various aspects and examples of a vibration isolation system, as well as related apparatus and methods, are described below and illustrated in the associated drawings. Unless otherwise specified, a vibration isolation system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a vibration isolation system in accordance with the present teachings includes a retaining portion, an anchor portion, and a layer of damping material. The anchor portion is at least partially received in, and trapped in, an internal space of the retaining portion. The layer of damping material is sandwiched between the retaining portion and the anchor portion. The retaining portion and the anchor portion are connected only through the layer of damping material, and do not make direct contact.

The layer of damping material may absorb energy of relative motion between the retaining portion and the anchor portion, and may thereby limit transfer of vibration between the retaining and anchor portions. The layer of damping material may be described as directly in a load path between the retaining portion and the anchor portion. The material of the layer may comprise any high loss material suitable for desired damping. Examples include, but are not limited to elastomer, natural or synthetic rubber, acrylic, silicone, and other viscoelastic materials. The damping material may be selected according to properties appropriate to desired damping. For example, a harder material with a higher hardness number on the Shore A Durometer scale may be selected for greater stiffness of the vibration isolation system and a softer material with a lower hardness number may be selected for greater damping by the vibration isolation system.

The retaining portion and the anchor portion may be configured to act as effectively rigid relative to the layer of damping material. The retaining and anchor portions may each comprise any appropriate material, including but not limited to an aluminum alloy or a carbon fiber composite. Preferably the two portions may be strong and light. Each of the retaining and anchor portions may be monolithic or composed of multiple discrete parts. For example, the retaining portion may comprise a single additively manufactured part, or may comprise two machined parts fastened together.

The vibration isolation system may be configured to damp vibration associated with shear, axial, and bending loads. Geometry of the system may be configured according to desired damping. For example, the layer of damping material may be inhomogeneous, to provide an asymmetric or axis-dependent response to loading. For another example, a thickness of the layer of damping material and/or dimensions of the anchor portion may be tuned to achieve desired stiffness.

The vibration isolation system may be configured for mounting or connecting two apparatus. In particular, the system may be configured for mounting an apparatus to a carrier. For example, the system may be configured for mounting a satellite to a launch vehicle. The retaining portion may be rigidly fixed to one of the two apparatus, while the anchor portion is rigidly fixed to the other apparatus. For example, the retaining portion may be fastened to a launch vehicle and the anchor portion may be fixed to a satellite. The layer of damping material may limit transfer of vibration between the retaining device and the anchoring device. In this manner, the layer of damping material may limit transfer of vibration between the two apparatus.

Examples, Components, and Alternatives

The following sections describe selected aspects of exemplary vibration isolation systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Satellite and Associated Method

Figure 2:
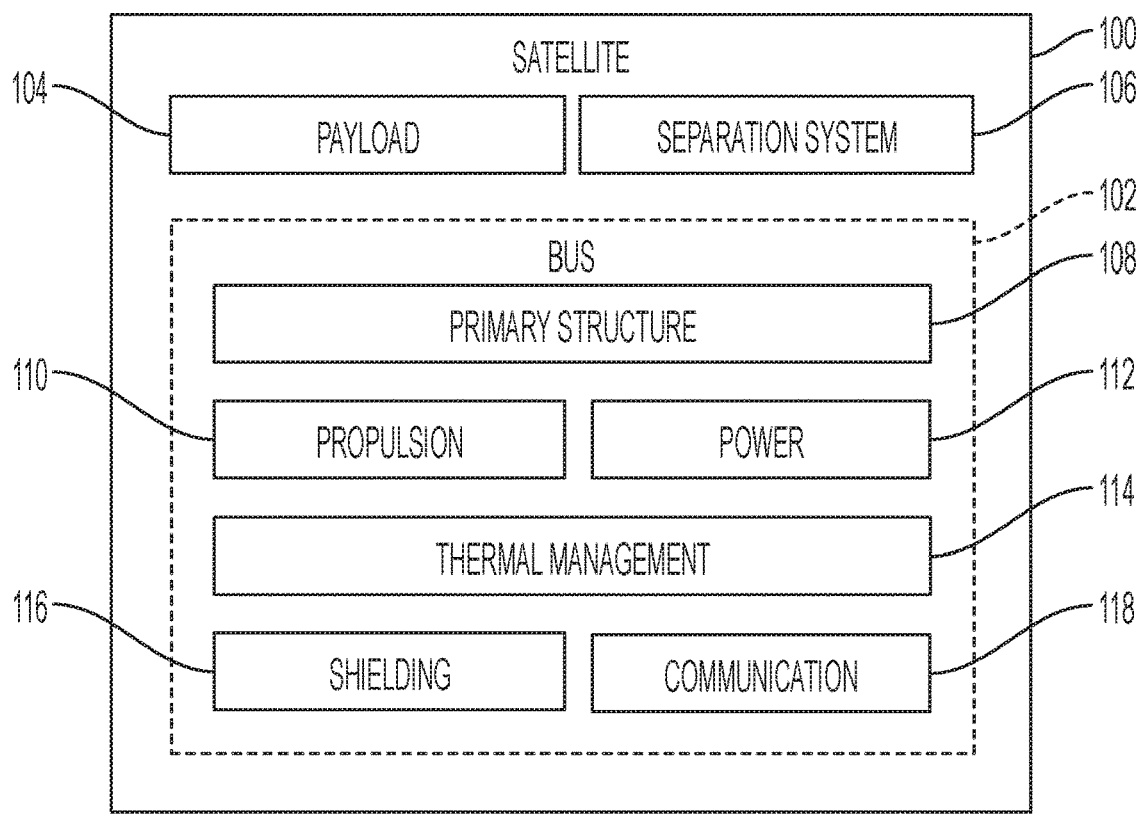
FIG. 2 is a block diagram of the satellite of FIG. 1.

Examples disclosed herein may be described in the context of an illustrative satellite launch method (see FIG. 1) and an illustrative satellite 100 (see FIGS. 1 and 2). In the present example, the method includes three phases: a launch phase 20, a separation phase 30, and a deployment phase 40. Launch phase 20 may include transporting satellite 100 from a planetary body 120 such as Earth to outer space 122, which may also be referred to as space, using a launch vehicle 124. In the context of Earth, outer space may comprise a region beyond the Karman line. Separation phase 30 may include separating satellite 100 from launch vehicle 124, once a desired location, trajectory and/or orbit has been achieved. Deployment phase 40 may include preparation of satellite 100 for operation, such as establishing communication with a controller on planetary body 120, extending solar panels or instrument arms, and/or maneuvering to a desired orientation relative to the planetary body. In some examples, the method may further include design, production, and/or in-service phases.

Each of the processes of the launch method may be performed or carried out by a system integrator, a third party, and/or an operator (e.g., a customer). For the purposes of this description, a system integrator may include, without limitation, any number of aerospace manufacturers and major-system subcontractors; a third party may include, without limitation, any number of vendors, subcontractors, and suppliers; and an operator may be a telecommunications company, leasing company, military entity, service organization, and so on. Apparatus and methods shown or described herein may be employed during any one or more of the stages of the satellite launch method.

As shown in FIG. 2, satellite 100 may include a bus 102 with a plurality of satellite systems, a payload 104 and a separation system 106. Separation system 106 may also be described as distinct from satellite 100 and/or as part of the launch vehicle. The separation system may be configured to mount satellite 100 to the launch vehicle during the launch phase, and to release the satellite from the launch vehicle during the separation phase.

Examples of the plurality of satellite systems include one or more of a primary structure 108, a propulsion system 110, an electrical power system 112, a thermal management system 114, a radiation shielding system 116, and a communication system 118. Each system may comprise various subsystems, such as controllers, processors, actuators, effectors, motors, generators, etc., depending on the functionality involved. Any number of other systems may be included. Although an unmanned artificial satellite example is shown, the principles disclosed herein may be applied to other aerospace vehicles and technology, such as a launch vehicle, space station, crewed spacecraft, and/or interstellar probe.

FIGS. 3A and 3B show launch of satellite 100 with a vibration isolator 126, in two possible configurations. In each configuration, separation system 106 is connected to isolator 126. For launch phase 20, satellite 100 is secured to launch vehicle 124 by the connected separation system and isolator, along a launch axis 128. Isolator 126 may be centered on and/or aligned with the launch axis, to maximize damping of launch associated vibrations. In a first configuration, shown in FIG. 3A, separation system 106 is fixed to launch vehicle 124 and isolator 126 is fixed to satellite 100.

In a second configuration, shown in FIG. 3B, separation system 106 is fixed to satellite 100 and isolator 126 is fixed to launch vehicle 124.

As a consequence, in deployment phase 40 for the first configuration, isolator 126 may remain connected to satellite 100. For the second configuration the isolator may remain connected to launch vehicle 124 and separate from the satellite. During the separation phase, separation system 106 may disconnect into a first part 106A and a second part 106B. In both the first and the second configurations, first part 106A may remain connected to satellite 100 through deployment phase 40. In the first configuration, first part 106A may be connected to the satellite through isolator 126 and in the second configuration the first part may be directly connected to the satellite.

One or another of the configurations may be selected based on design or requirements of satellite 100 and/or the type of separation system 106. The first configuration may allow vibration isolator 126 to mitigate effects on the satellite of any shock caused by separation system 106 during the separation phase. The second configuration may reduce the separated mass of satellite 100, which in turn may reduce fuel consumption by propulsion system 110 during operation of the satellite.

B. Illustrative Planate Dynamic Isolator

Figure 4:
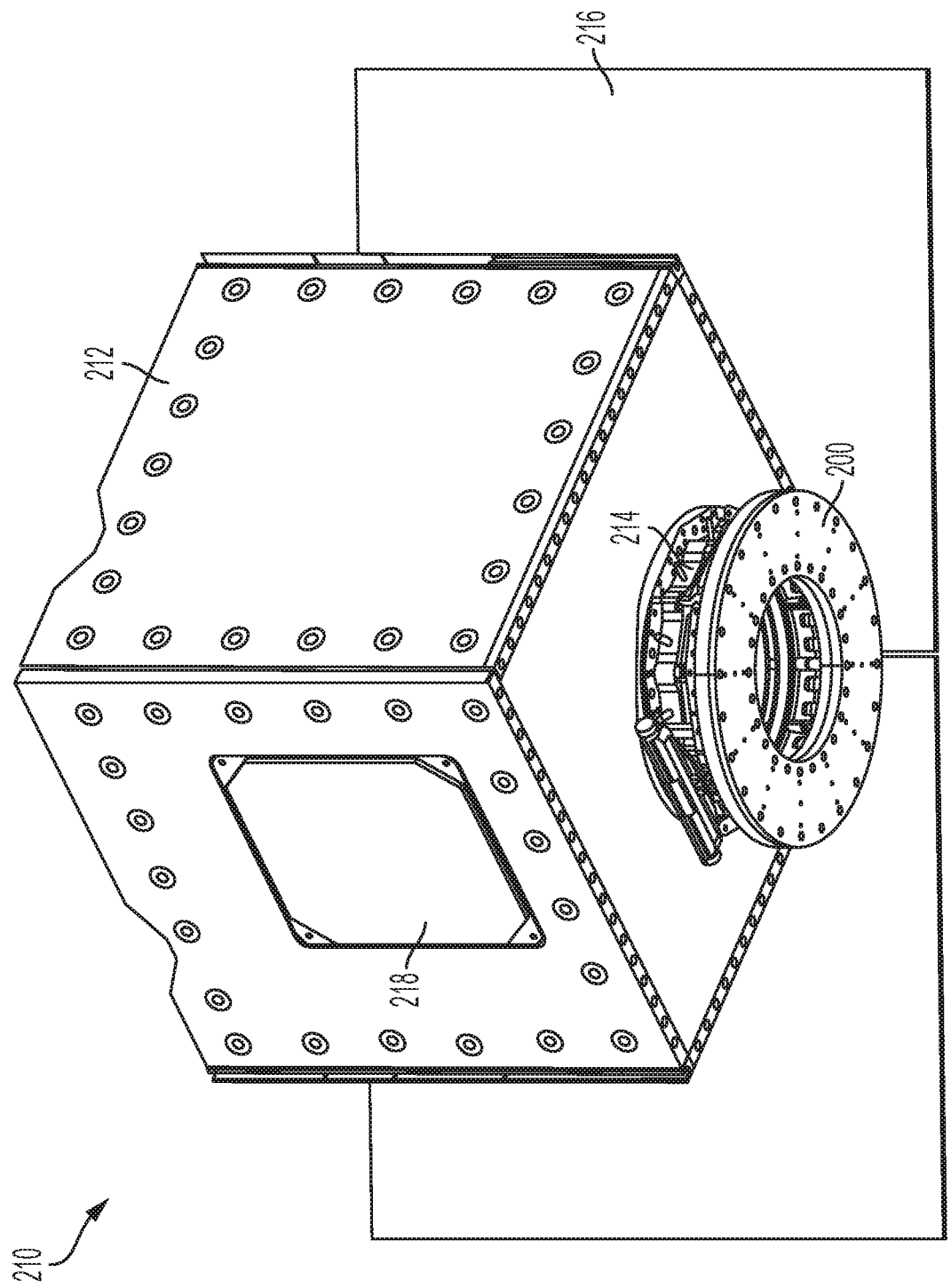
FIG. 4 is an isometric view of another illustrative satellite in accordance with aspects of the present disclosure.

As shown in FIGS. 4-10C, this section describes an illustrative planate dynamic isolator 200. Dynamic isolator 200 is an example of a vibration isolation system, as described above. FIG. 4 is an isometric view of a satellite 210, which may be an example of a satellite 100 as described above.

Satellite 210 is generally cuboidal in shape, and may be described as a cubesat and/or a micro-satellite. Satellite 210 is an example of satellite 100 as described in Example A. The satellite includes a main body 212 which forms the primary structure of the satellite, and is an example of primary structure 108 as also described in Example A. In the depicted example, main body 212 is between approximately 10-30 inches (250-800 millimeters) in width. A separation system 214, solar panels 216, and a plate antenna 218 are mounted to main body 212.

Separation system 214 is an example of separation system 106 as described in Example A, and may also be described as a launch vehicle interface ring. The separation system is configured to act as a sole connection between satellite 210 and a rocket powered vehicle during launch, then facilitate disconnection of the satellite from the vehicle. In the depicted example, separation system 214 is a band-style separation system such as a clamp band or Motorized Light Band (MLB). In some examples, the satellite may employ other separation systems such as a dispenser-style Quadpack or Canisterized Satellite Dispenser (CSD). In such examples, dynamic isolator 200 may be differently configured to facilitate connection with the separation system, as discussed further below.

Solar panels 216 are configured to supply satellite 210 with electrical power and are integrated with an electrical system of the satellite, such as power system 112 as described in Example A. The electrical system may further include one or more batteries, controllers, transformers, switches, printed circuit boards, wiring, etc. according to the desired functionality. The electrical system may supply power to one or more satellite systems and/or payload equipment.

Plate antenna 218 is configured to send and receive data while in space, in cooperation with a communication system of the satellite, such as communication system 118 as described in Example A. The communication system may include one or more processors, encoders, modulators, transmitters, receivers, data storage devices, additional antennas, etc. according to the desired functionality.

As shown in FIG. 4, dynamic isolator 200 is mounted to separation system 214. The dynamic isolator is also mounted to a launch vehicle, not shown, and may be aligned with a launch axis of the vehicle as described further below. Relative positions and orientations of components of satellite 210 and dynamic isolator 200 may be described according to a pre-launch configuration of the launch vehicle and the satellite. The dynamic isolator may be used in any orientation, but the following description will assume that the satellite is mounted on top of a support of the launch vehicle, and the relational prepositions such as "above" and "under" and positional descriptors such as "top" and "side" will be used with reference to this orientation for description simplicity, but without restrictive effect.

Figure 5:
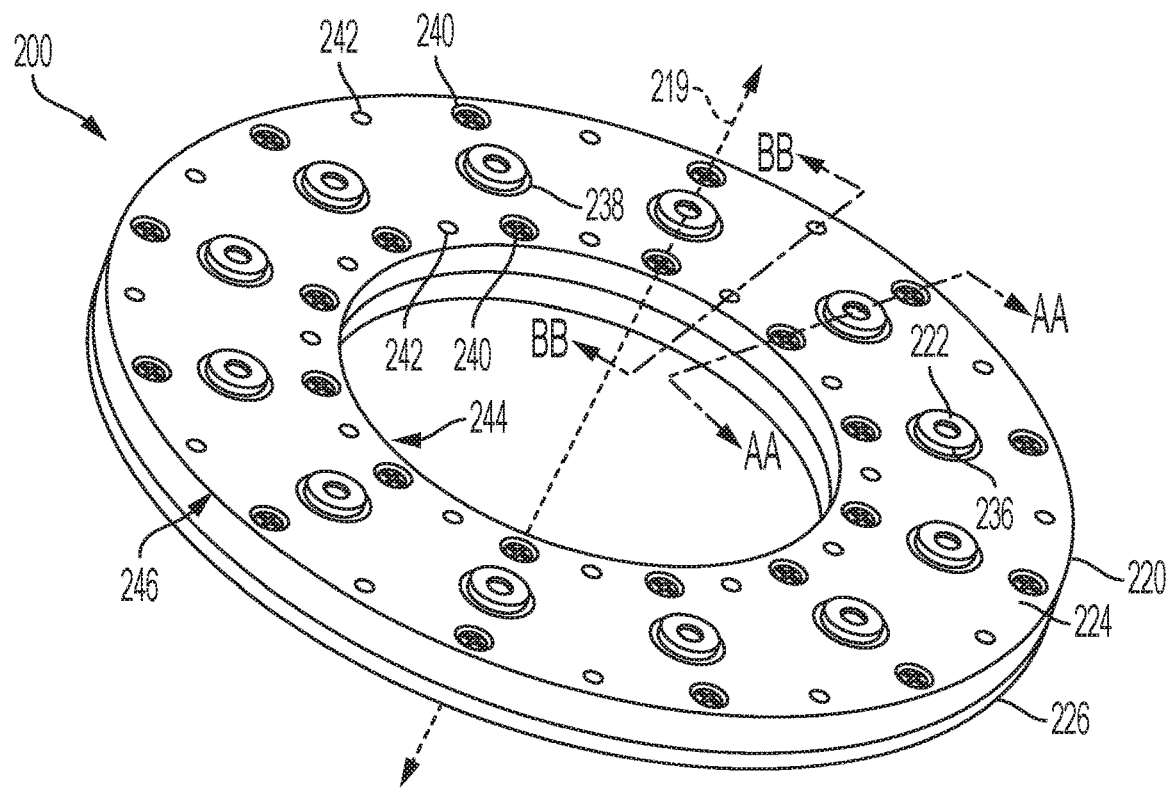
FIG. 5 is an isometric view of the dynamic isolator of FIG. 4.

FIG. 5 is an isometric view of dynamic isolator 200. The isolator has an overall ring or annulus shape with a central axis 219, and may be described as substantially flat or planate with a limited height or thickness. In some examples, dynamic isolator may have a non-circular shape such as a square or hexagon. However, a circular shape may be preferable to achieve a symmetric and/or homogenous load response, and avoid concentration of loads at corners. The isolator may be configured to occupy and operate within a limited space. In other words, the isolator may be compact.

Dynamic isolator 200 includes a retaining ring 220 and an anchor 222. In the depicted example, retaining ring 220 is made up of an upper race 224 and a lower race 226. The upper and lower races are fastened together, trapping anchor 222 in retaining ring 220. A damping layer 228 is sandwiched between the retaining ring and the anchor. As shown in the exploded view of FIG. 6, anchor 222 includes a ring structure 234 and a plurality of bosses 236. The anchor may also be described as an anchor structure, ring 234 as a foot portion and bosses 236 as linkage members. Damping layer 228 covers anchor ring 234 and surrounds each of bosses 236, covering a base portion of the bosses proximate the anchor ring.

Figure 6:
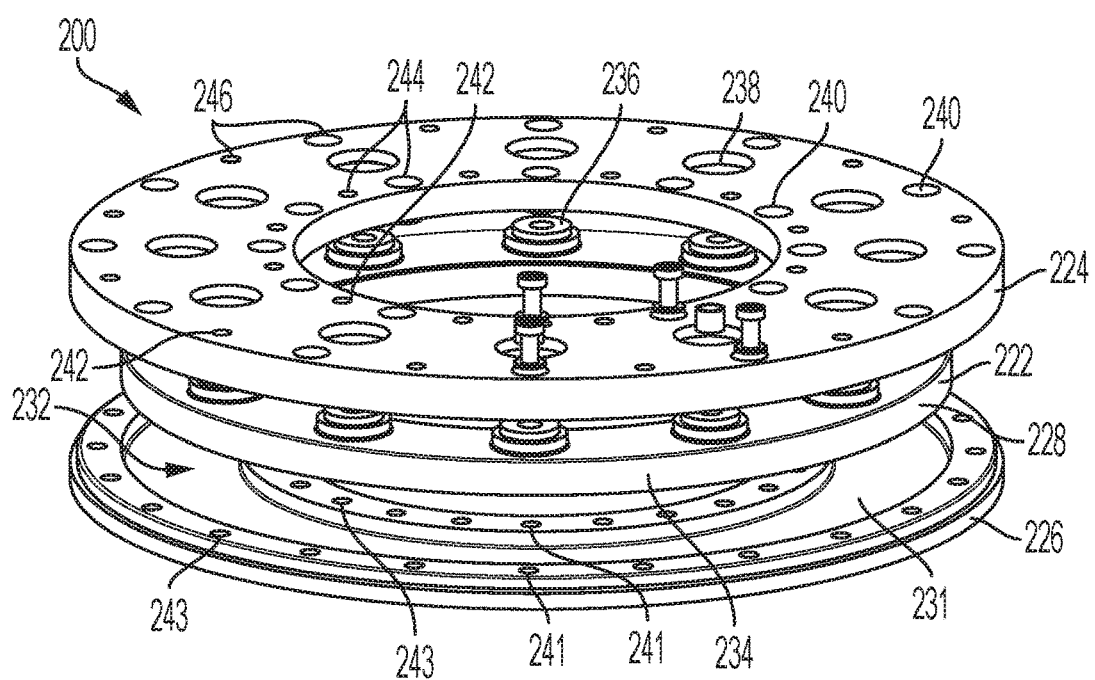
FIG. 6 is an exploded view of the dynamic isolator of FIG. 4.

As also shown in FIG. 6, lower race 226 includes a recessed channel 231. Upper race 224 includes a corresponding recessed channel 230, which can be seen in cross-section in FIGS. 7-9. Together, recessed channels 230, 231 of the upper and lower races form an internal cavity 232 of retaining ring 220. Internal cavity 232 is sized and shaped to receive anchor ring 234 and the surrounding portions of damping layer 228.

Damping layer 228 is configured to mediate all interaction between retaining ring 220 and anchor 222. The retaining ring is not in direct contact with the anchor, and is connected to the anchor only through the damping layer. The anchor and retaining ring may be described as movable relative to one another, within the limited range of the gap defined between the two parts and filled by damping layer 228. The damping layer may absorb energy from and restrain such relative motion, thereby damping vibration and limiting transmission of the vibration between the retaining ring and the anchor.

Retaining ring 220 and anchor 222 are effectively rigid relative to damping layer 228. In the present example, the retaining ring and anchor are comprised of an aluminum alloy and the damping layer is a synthetic rubber. The synthetic rubber may have a hardness between approximately 10 to 100 on the Shore A hardness scale, or preferably a hardness between approximately 30 to 50. Hardness of the material may be evaluated according to a widely recognized testing standard such as ASTM D2240 or ISO 7619. The hardness of the damping layer material and/or other properties thereof may be selected according to a desired stiffness of isolator 200. For example, a material having a hardness between 10 and 100 may be generally appropriate to damping, but a material having a hardness between 30 and 50 may be selected as more specifically appropriate to damping vibrations associated with satellite launch, particularly for a microsatellite or other equipment of similar size, mass, and vibrational properties.

In general, retaining ring 220, anchor 222, and damping layer 228 may include any material or materials having an appropriate difference in stiffness. For example, the retaining ring and/or the anchor may comprise a high stiffness polymer composite and the damping layer may comprise a high loss viscoelastic polymer. The materials may also be selected according to an expected operational environment. For instance, in the present example, the synthetic rubber of damping layer 228 is selected for a wide range of temperature tolerance due to the dramatic temperature variation experienced during satellite launch.

In the present example, retaining ring 220 and anchor 222 are manufactured by machining, and damping layer 228 is manufactured by injection molding as described further with reference to FIG. 7, below. In general, the retaining ring, anchor and/or damping layer may be produced by any effective method. For example, the retaining ring and anchor may be additive manufactured. In such an example, retaining ring 220 may be a single monolithic structure and anchor 222 may be printed with ring structure 234 trapped in internal cavity 232. Additive manufacturing may be a desirable manufacturing method due to the ease of design customization, which may facilitate tuning of isolator 200, as described further below.

Upper race 224 includes a plurality of primary holes 238, which extend into recessed channel 230 of the upper race, and internal cavity 232. Primary holes 238 correspond to bosses 236. That is upper race 224 includes a primary hole 238 corresponding to each boss 236. Each boss extends from anchor ring 234 through the corresponding primary hole. Bosses 236 thereby facilitate fastening of anchor 222 to the separation system, as discussed further with reference to FIG. 9, below.

Upper race 224 further includes a plurality of secondary holes 240 and a plurality of tertiary holes 242. Lower race 226 also includes include a plurality of secondary holes 241 and a plurality of tertiary holes 243. Upper secondary holes 240 align with lower secondary holes 241 and upper tertiary holes 242 align with lower tertiary holes 243. Secondary holes 240, 241 are configured for fastening together upper race 224 and lower race 226, while tertiary holes 242, 243 are configured to facilitate fastening of retaining ring 220 to the launch vehicle.

Each plurality of secondary and tertiary holes 240, 241, 242, 243 may be described as including an inner set 244 of holes, arranged in a circle proximate an inner radius of retaining ring 220, and an outer set 246 of holes, arranged in a circle proximate an outer radius of the retaining ring. As can be seen in FIG. 6, inner sets 244 are disposed proximal to central axis 219 from recessed channels 230 and outer sets 246 are disposed distal of the central axis from the recessed channels. As a consequence, none of the pluralities of secondary and tertiary holes extends into internal cavity 232 of retaining ring 220. In the present example, upper race 224 includes twelve primary holes 238, twelve secondary holes 240 in each of inner set 244 and outer set 246, and twelve tertiary holes 242 in each of the inner and outer sets, for a total of twenty four secondary holes and twenty four tertiary holes. The holes may be described as pairs of secondary holes 240 alternating with pairs of tertiary holes 242 around the circumference of upper race 224. Lower race 226 similarly includes twelve pairs of secondary holes 241 and twelve pairs of tertiary holes 243 alternating around the circumference. In general, upper and lower races 224, 226 may include any effective number of holes. The number of holes may be selected according to a size of dynamic isolator 200, a selected fastener size, an interface of separation system 214, and/or an interface of the launch vehicle as discussed further below.

Figure 7:
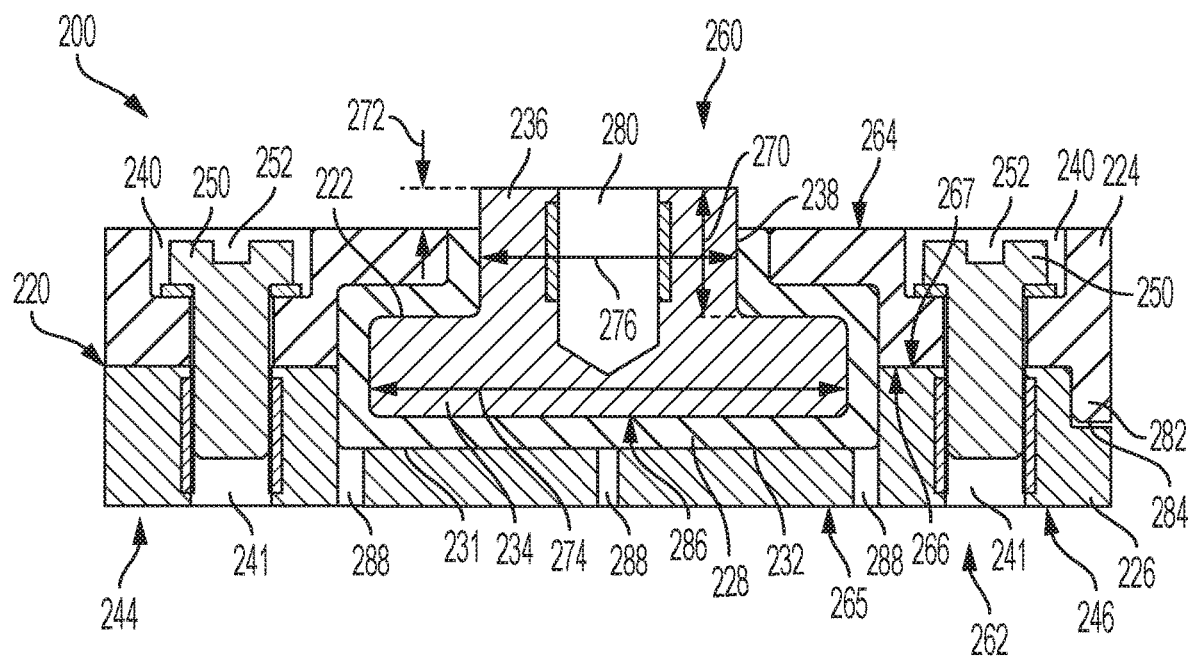
FIG. 7 is a cross-sectional view of the dynamic isolator of FIG. 4, along plane AA as shown in FIG. 5.
Figure 8:
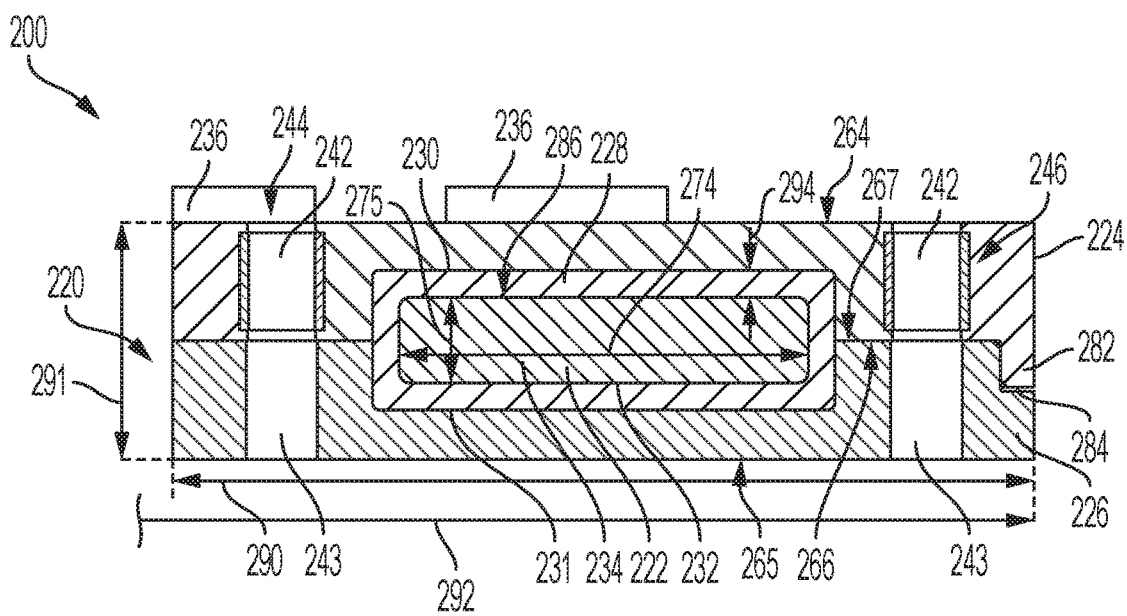
FIG. 8 is a cross-sectional view of the dynamic isolator of FIG. 4, along plane BB as shown in FIG. 5.

FIGS. 7 and 8 show cross-sections through isolator 200 taken through planes AA and BB in FIG. 5, respectively. The following description of the depicted primary, secondary, and tertiary holes, the boss, and the sections of the anchor ring and upper and lower races may be understood to be representative and apply similarly to the remainder of isolator 200.

Dynamic isolator 200 may be described as having a top side 260 and a bottom side 262, where the top side is configured for connection to the separation system of the satellite and the bottom side is configured for connection to the launch vehicle. The top side of the isolator includes an external face 264 of upper race 224 and a top surface of bosses 236. The bottom side of the isolator includes an external face 265 of lower race 226. Upper race 224 and lower race 226 each further include an internal face 266, 267. Upper internal face 266 is facing and in contact with lower internal face 267. Channels 230, 231 are each recessed into the internal face 266, 267 of the corresponding race, to form internal cavity 232.

FIG. 7 is a cross section through one of bosses 236 extending through a corresponding one of primary holes 238. Also shown in cross-section are one of upper secondary holes 240 of outer set 246 aligned with a corresponding one of lower secondary holes 241 of outer set 246, and one of upper secondary holes 240 of inner set 244 aligned with a corresponding one of lower secondary holes 241 of inner set 244.

A retaining ring bolt 250 extends through each pair of corresponding, aligned secondary holes 240, 241 to fasten upper race 224 to lower race 226. More specifically, bolt 250 extends down through upper secondary hole 240 into lower secondary hole 241. Upper secondary hole 240 and/or lower secondary hole 241 may be threaded to engage bolt 250. In the depicted example only lower secondary hole 241 is threaded.

Each upper secondary hole 240 includes a recess 252 sized and shaped to accommodate a head of retaining ring bolt 250 and a washer. Recess 252 may be described as at a top end of upper secondary hole 240 and/or as recessed into external face 264 of upper race 224 on top side 260 of dynamic isolator 200. Recessing bolts 250 into upper race 224 may reduce the overall height of the dynamic isolator, and the clearance between the isolator and the separation system, as discussed further with reference to FIG. 9, below.

Upper race 224 and lower race 226 are also interlocked at an outer circumferential edge of retaining ring 220. Upper race 224 includes a lip 282, which extends from internal face 266 down toward lower race 226. Lower race 226 includes a recess 284 in internal face 267, configured to receive the lip. Each of lip 282 and recess 284 extend uniformly around a full circumference of the corresponding race. In the present example, lip 282 has a generally rectangular cross-sectional shape and an overall circular extent. In general, lip 282 and recess 284 may have any complementary shapes. In some examples, lip 282 and recess 284 may be spaced radially inward from the outer circumferential edge of retaining ring 220 and/or may be disposed at an inner circumferential edge of the retaining ring.

Lip 282 may be described as fitting over lower race 226, and/or as fitting into recess 284. The lip may improve resistance of retaining ring 220 to shear forces, and prevent relative lateral movement between the upper and lower races. Lip 282 may fit tightly over lower race 226 and/or snugly into recess 284. Relative movement between upper race 224 and lower race 226 in any lateral direction may be resisted by contact of lip 282 against lower race 226 at a corresponding point around the circumference of retaining ring 220.

Boss 236 extends up from anchor ring 234 through primary hole 238, clear of external face 264 of upper race 224. That is, the boss does not lie flush with the upper external face. The boss may be described as having a base portion internal to the primary hole and/or upper race, and a head portion clear of the hole and/or upper race. Boss 236 has a height 270 and extends a distance 272 past upper external surface 264. Distance 272 may also be referred to as a clearance height of boss 236 and/or of dynamic isolator 200.

Boss 236 is circular, and includes a central aperture 280. The boss is centered relative to an annular extent or width 274 of anchor ring 234. In other words, the cross-sectional shape of anchor 222, including boss 236 and anchor ring 234, is symmetrical. In the present example, a diameter 276 of boss 236 is approximately half of width 274 of the anchor ring. Diameter 276 may be sufficiently large for boss 236 to both accommodate a central aperture appropriate to a selected bolt size, and to provide a secure connection between the bolt and anchor ring 234. Width 274 of anchor ring 234 may be selected to achieve desired stiffness of anchor structure 222, as described further below.

Anchor ring 234 has an external surface 286, which is covered by damping layer 228. The damping layer may also be described as filling internal cavity 232 between anchor 222 and retaining ring 220. Damping layer 228 conforms to external surface 286 and recessed channels 230, 231 of the upper and lower races 224, 226. The damping layer also fills primary hole 238 between boss 236 and upper race 224, lying flush with external face 264 of the upper race. That is, the damping layer does not extend out of primary hole 238, past external face 264. Damping layer 228 may also be described as surrounding the base portion of boss 236 and not the head portion of the boss.

In the present example, damping layer 228 is formed by injection molding. Lower race 226 includes a plurality of injection ports 288. Each injection port extends from internal face 267 in recessed channel 231 to external face 265 of the lower race. That is, each injection port is in fluid communication with internal cavity 232. To form damping layer 228, retaining ring may be assembled by fastening upper race 224 to lower race 226, thereby trapping anchor 222 in internal cavity 232. The anchor may be held suspended in a desired position relative to the retaining ring. Material of damping layer 228 may be injected through ports 288 into internal cavity 232, and cured.

FIG. 8 is a cross section through anchor ring 234 between bosses 236. Also shown in cross-section are one of upper tertiary holes 242 of outer set 246 aligned with a corresponding one of lower tertiary holes 243 of outer set 246, and one of upper tertiary holes 242 of inner set 244 aligned with a corresponding one of lower tertiary holes 243 of inner set 244. When dynamic isolator 200 is attached to the launch vehicle, a bolt, not pictured, may extend through each pair of corresponding, aligned tertiary holes 242, 243 to fasten retaining ring 220 to the launch vehicle. More specifically, the bolt may extend up from a dispenser plate of the launch vehicle, through lower tertiary hole 243 into upper tertiary hole 242. Upper tertiary hole 242 and/or lower tertiary hole 243 may be threaded to engage the bolt. In the depicted example, only upper tertiary hole 242 is threaded.

In some examples, only lower race 226 may include tertiary holes and retaining ring 220 may be fastened to the launch vehicle by the lower race. However, fastening both upper race 224 and lower race 226 to the launch vehicle by aligned tertiary holes 242, 243 may be advantageous. The fasteners may be tightened to tension upper race 224 against lower race 226, improving the connection between the races without compressing damping layer 228 or anchor ring 234. Such connection to both races may also effectively transfer loads from the launch vehicle to both the upper and lower races, and prevent loads on dynamic isolator 200 prying apart the races.

Retaining ring 220 has an annular extent or width 290, an axial extent or height 291, and an outer radius 292. Width 290 and height 291 may be minimized to limit weight and overall envelope size of dynamic isolator 200. As shown in FIG. 7, width 290 is sufficient to accommodate selected dimensions of anchor ring 234, boss 236, and retaining ring bolts 250. Referring again to FIG. 8, width 290 of the retaining ring is also sufficient to accommodate a selected spacing between tertiary holes 242, 243 of the outer and inner sets.

Outer radius 292 and the spacing between tertiary holes 242, 243 may be selected according to an attachment or mounting structure of the launch vehicle. In other words, radius 292, width 290, and the layout of tertiary holes 242, 243 may be configured to match the mounting structure of the launch vehicle. In some examples, dynamic isolator 200 may be configured to match or conform to an existing mount design. For instance, the isolator may simulate a connection interface of a separation system, such that the dynamic isolator can be 'dropped in' to a satellite connection and attach to the launch vehicle in place of the separation system.

In the present example, outer radius 292 of retaining ring 220 is approximately 5.25 inches and width 290 is approximately 2.5 inches. Height 291 is approximately 0.7 inches, and clearance 272 of boss 236 is approximately 0.1 inches, for an effective envelope height of dynamic isolator 200 of approximately 0.8 inches. Outer radius 292 may be between approximately one quarter and one half of a length or width of the satellite. Width 290 may be between approximately one third and two thirds of outer radius 292. Height 291 may be between approximately one eighth and one sixth of outer radius 292, or may be between approximately one twenty-fifth and one tenth of the length or width of the satellite.

Anchor ring 234 also has an axial extent or height 275. In the present example, anchor ring 234 is approximately rectangular in cross section and has constant height 275 and constant width 274 around the circumference of the ring. The cross-sectional shape of anchor ring 234 matches the cross-sectional shape of internal cavity 232 such that damping layer 228 has a constant thickness 294 on all sides of the anchor ring. As shown in FIG. 7, boss 236 and primary hole 238 are sized such that damping layer thickness 294 is also the same around the boss.

In the present example, thickness 294 of damping layer 228 is approximately 80 thousandths of an inch (mil).

Preferably, thickness 294 may be between approximately 50 mil and 200 mil. In the present example, anchor ring width 274 is approximately 1 inch and anchor ring height 275 is approximately 0.25 inches. Height 275 of anchor ring 234 may be between approximately one quarter and one half of height 291 of retaining ring 220. Damping layer thickness 294 may be between approximately one fifth and one half of anchor ring height 275.

In some examples, anchor ring 234 and/or boss 236 may be sized and/or shaped such that thickness 294 of damping layer 228 varies between the sides of the anchor ring, around the circumference of the anchor ring, and/or in primary hole 238. For instance, anchor ring 234 and/or internal cavity 232 may have an asymmetrical and/or non-rectangular cross-sectional shape. For instance, an aspect ratio of the cross section of anchor ring 234 may differ from an aspect ratio of the cross section of internal cavity 232 such that damping layer 228 is thicker on one or more sides of the anchor ring. In a specific example, damping layer 228 may be 120 mil thick above and below anchor ring 234 and only 80 mil at either side of the ring.

Thickness 294 and geometry of anchor ring 234 and internal cavity 232 may be configured to tune the stiffness of dynamic isolator 200, as discussed further below. External faces 264, 265 of retaining ring 220 may be configured for connection to the separation system and launch vehicle, as also discussed further below. In the present example, the exterior and interior of retaining ring 220 as well as anchor ring 234 have a corresponding rectangular cross-sectional shape. In some examples, the geometry of the exterior may differ from the geometry of the interior. For instance, retaining ring 220 may have a rectangular exterior cross-sectional shape, but internal cavity 232 may be circular in cross-section. For another instance, retaining ring 220 may instead be a retaining square while anchor ring 234 remains a ring. In addition to tuning for dynamic properties and/or facilitating connection, geometry of the dynamic isolator may be configured according to a selected manufacturing method.

As depicted in FIGS. 5-8, retaining ring 220 has square corners at external faces 264, 264 of the upper and lower races 224, 226 and at the top surface of bosses 236. Such corners may be quick and inexpensive to manufacture by machining. Corners of recessed channels 230, 231, and anchor ring 234 are curved, rounded or radiused. For example, the corners may have a radius between approximately 10 and 40 mil. Such rounded corners may facilitate effective filling of internal cavity 232 and coverage of external surface 286 of anchor ring 234 during injection molding of damping layer 228. In examples where one or more components of dynamic isolator 200 are produced by additive manufacturing or other methods aside from machining and/or injection molding, the dynamic isolator may be similarly designed to facilitate simple and inexpensive manufacture. For example, the internal cavity and/or anchor ring may have a diamond shape to avoid the need for sacrificial support structures in additive manufacture.

Figure 9:
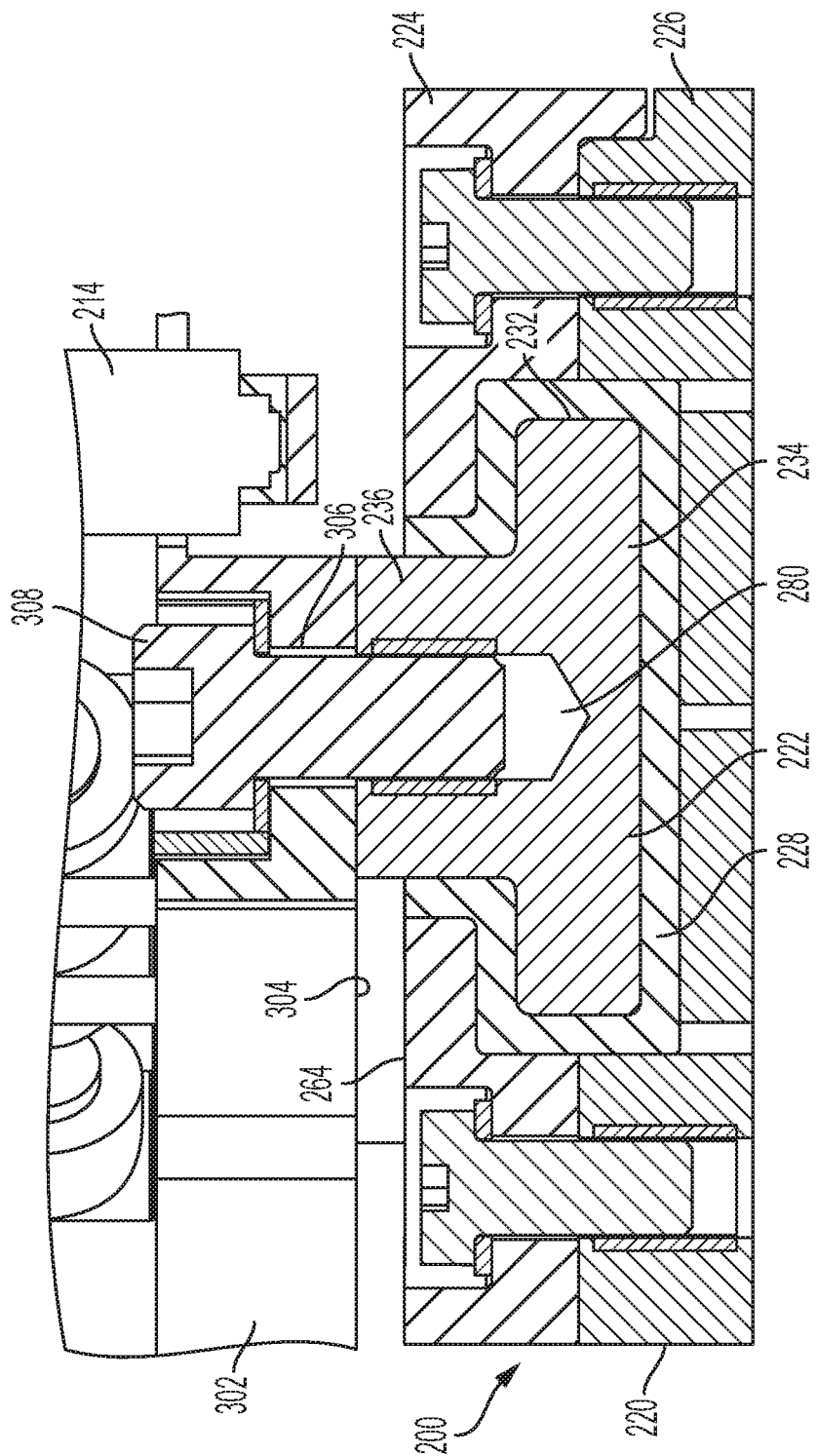
FIG. 9 is a cross-sectional view of the dynamic isolator and the separation system of FIG. 4, along plane AA.

FIG. 9 is another view of the cross section of FIG. 7, with separation system 214 mounted to dynamic isolator 200. In the present example, the separation system includes a lower band structure 302 with a bottom surface 304 and a plurality of apertures 306. The apertures are regularly spaced around a circumference of lower band structure 302, proximate an outer edge of the structure. Bosses of 236 of the dynamic isolator are configured to correspond to apertures 306 of the separation system. In other words, for each aperture of the separation system anchor 222 includes a corresponding boss 236 with central aperture 280. Bosses 236 are also positioned to match apertures 306 such that when dynamic isolator 200 is mounted to separation system 214, each aperture 306 can be aligned with a corresponding central aperture 280 of a boss.

In some examples, dynamic isolator 200 may be configured to match or conform to an existing mount design. For instance, the isolator may simulate a connection interface of a launch vehicle and/or dispenser plate, such that the dynamic isolator can be 'dropped in' to a satellite connection and attach to the separation system in place of the launch vehicle. In the present example, lower band structure 302 is annulus or ring shaped and apertures 306 are arranged in a circle. Central apertures 280 are therefore also arranged in a circle. In the present example, the circle has a radius of approximately 4 inches.

A band bolt 308 extends through each pair of corresponding, aligned band apertures 306 and boss central apertures 280 to fasten lower band structure 302 of separation system 214 to anchor 222. More specifically, bolt 308 extends down through band aperture 306 into central aperture 280. Band aperture 306 and/or central aperture 280 may be threaded to engage bolt 308. In the depicted example only central aperture 280 is threaded.

Lower band structure 302 contacts boss 236 of anchor 222, but is spaced from upper race 224 of retaining ring 220. More specifically, bottom surface 304 of the lower band structure contacts the top surface of boss 236 but is spaced from external face 264 of upper race 224 by the boss. Clearance height 272 (see FIG. 7) of boss 236 may determine the spacing between the lower band structure and the retaining ring. The clearance height may be sufficiently large to provide effective spacing between the lower band structure and the retaining ring, but may be limited to reduce the overall envelope height of the dynamic isolator. Clearance height 272 may be selected such that anticipated flex or other deformation of either separation system 214 or dynamic isolator 200 will not result in contact between lower band structure 302 and retaining ring 220.

All surfaces and structures of separation system 214 may be spaced from retaining ring 220 when the separation system is mounted to the dynamic isolator. Such separation may allow rigid connection between the separation system and anchor 222 while avoiding direct mechanical interaction between the separation system and retaining ring 220. All interaction between separation system 214 and the launch vehicle mounted to the retaining ring may therefore be mediated by damping layer 228.

Dynamic isolator 200 may be tuned to have desired damping characteristics such as stiffness. Efficacy of the isolator may be improved when damping forces resulting from the stiffness of anchor structure 222 and/or damping layer 228 are tuned to correspond to expected vibrational frequencies, modes, and/or amplitudes of the launch vehicle. Expected vibrations of launch may be characterized as part of a design process for the satellite, and dynamic isolator 200 may be designed such that the damping forces are tuned accordingly. In some examples, dynamic isolator 200 may be tuned to filter out one or more natural frequencies of the satellite or an intended payload of the satellite. Such tuning may protect the satellite from damagingly high loading experienced as a result of vibration at a natural or resonant frequency.

Dynamic isolator 200 may be tuned by selecting a material and/or geometry of damping layer 228. Geometry of damping layer 228 may be dictated by the geometry of the spacing or gap formed between ring 234 of anchor structure 222 and internal cavity 232 of retaining ring 220. Tuning may include varying stiffness of the dynamic isolator along one or more axes. Increased stiffness may provide greater structural strength to the connection of the satellite to the launch vehicle, while decreased stiffness may provide greater damping. Expected forces may be calculated based on forcing frequencies of the launch vehicle, and/or properties of the satellite such as weight and inherent damping.

Figure 10A:
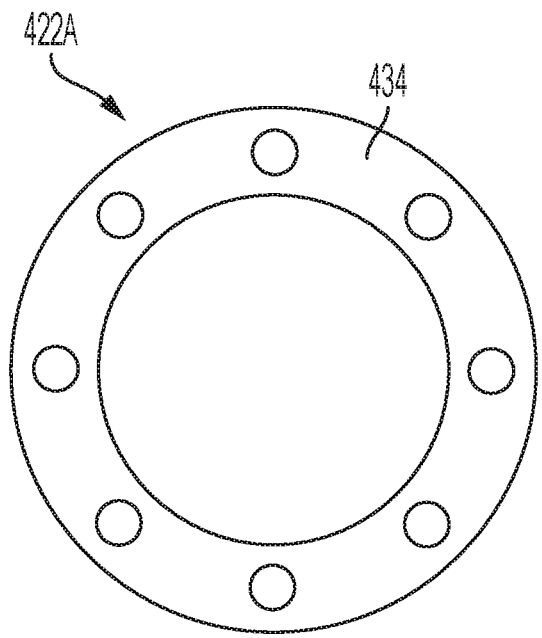
FIG. 10A is a schematic diagram of an illustrative anchor ring.
Figure 10C:
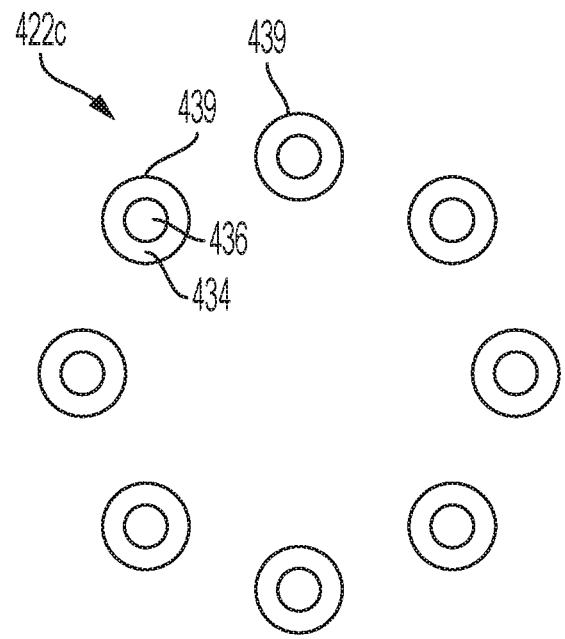
FIG. 10C is a schematic diagram of an illustrative multi-segment anchor structure.
Figure 10B:
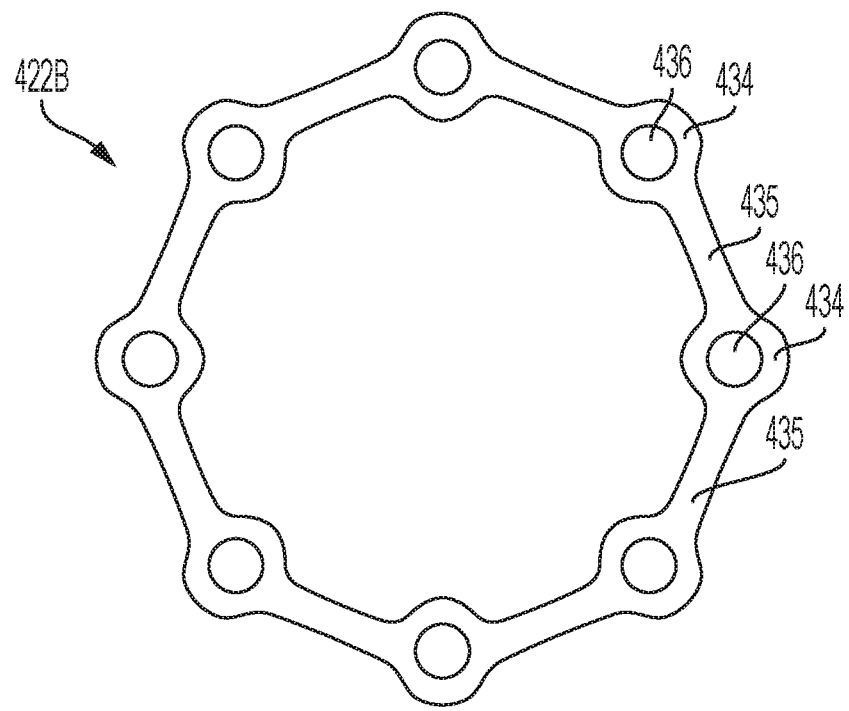
FIG. 10B is a schematic diagram of an illustrative anchor structure.

In the example depicted in FIGS. 4-9, anchor ring 234 is a continuous ring having a constant width 274. FIG. 10A depicts another example of a constant width anchor ring 422A. Such a ring may provide good structural strength and stiffness to dynamic isolator 200, but may limit damping. FIGS. 10B and 10C depict two alternative examples of anchor structures 422B and 422C which may reduce stiffness and accordingly provide greater damping.

In FIG. 10B, anchor structure 422B includes a continuous ring with varying width. The width of the ring increases proximate bosses 436 and decreases between the bosses, resulting in wider footing portions 434 alternating with narrower bridging portions 435. Footing portions 434 are disposed underneath bosses 436, facilitating a strong connection of the ring to the bosses and therefore of anchor 422B to the separation system. Bridging portions 435 may be slightly narrower, or significantly narrower than footing portions 434. For example, bridging portions 435 may be square in cross-section and have a width of approximately 0.25 inches.

In FIG. 10C, anchor structure 422C includes a plurality of segments 439. Each segment includes a footing portion 434 and a boss 436. Footing portions 434 are depicted as cylindrical, but may be rectangular, cuboid, and/or any effective shape. Each footing portion has an external surface 486, which is covered by the damping layer. Further, the external surface of each footing portion may be covered by a single damping layer or one of a plurality of sections of damping layer, according to the configuration of the retaining ring.

For example, for a rectangular ring-shaped internal cavity such as is shown in FIGS. 6-9, anchor structure 422C may be surrounded by a unitary damping layer extending between each pair of adjacent segments 439. For another example, the retaining ring may include a plurality of internal cavities. Each internal cavity may trap a corresponding one of segments 439 and may be filled with a discrete damping layer section.

C. Illustrative Method

Figure 11:
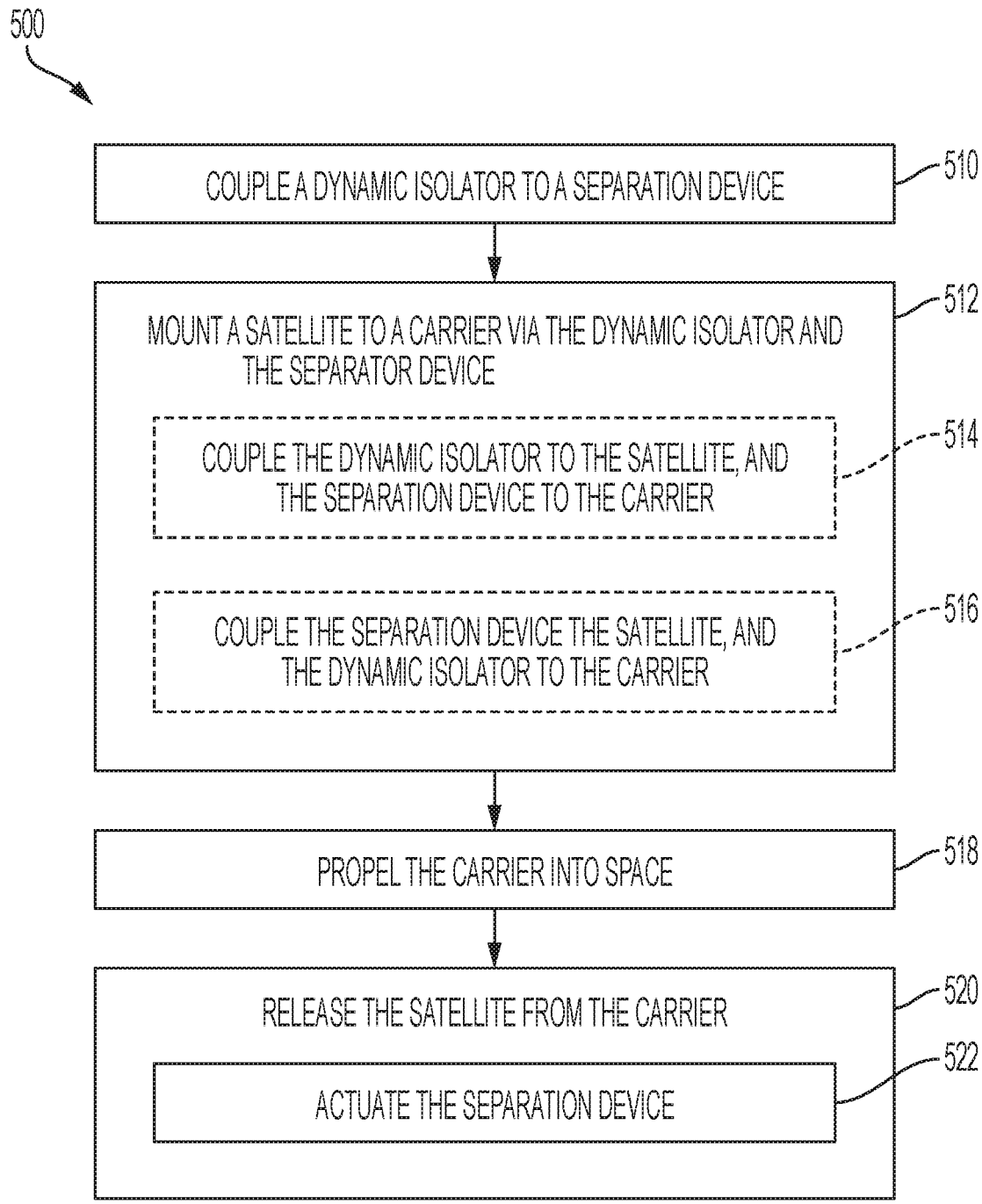
FIG. 11 is a flow chart depicting steps of an illustrative method of carrying a satellite to space, according to the present teachings.

This section describes steps of an illustrative method 500 for carrying a satellite into space; see FIG. 11. Aspects of satellites, launch vehicles, and/or vibration isolation systems described above may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

At step 510 the method includes coupling a dynamic isolator to a separation device. The dynamic isolator may include a retaining portion, an anchor portion, and a layer of damping material. The anchor portion may be trapped in an internal space of the retaining portion, with the layer of damping material sandwiched between the retaining portion and the anchor portion. The retaining portion and the anchor portion may be connected only through the layer of damping material and not in direct contact. The layer of damping material may absorb energy of relative motion between the retaining portion and the anchor portion, and may thereby limit transfer of vibration between the retaining and anchor portions.

The separation device may be configured to act as a sole connection between a satellite and a carrier such as a rocket powered vehicle during launch, then facilitate disconnection of the satellite from the carrier. For example, the separation device may be band-style, such as a clamp band or Motorized Light Band (MLB), or may be dispenser-style, such as a Quadpack or Canisterized Satellite Dispenser (CSD). The separation device.

The dynamic isolator may be configured for connection to the separation device. For example, the dynamic isolator may include a plurality of threaded apertures corresponding to a plurality of apertures of the separation device. In such an example, the dynamic isolator may be fastened to the separation device by inserting a threaded fastener through each pair of aligned apertures to engage a threaded aperture of the dynamic isolator.

Either the retaining portion or the anchor portion of the dynamic isolator may be coupled to the separation device, not both. The other portion may be only indirectly connected to the separation device through the layer of damping material of the dynamic isolator.

The dynamic isolator may be connected, fastened, and/or fixed to the separation device in any manner resulting in an effectively rigid connection. For example, the dynamic isolator may be bonded or welded to the separation device, may be mechanically linked to the separation device, and/or may be manufactured as monolithic with a component of the separation device. Fastening may be preferable, as offering a simple, inexpensive, and consistently repeatable method of rigid connection.

Step 512 of the method includes mounting a satellite to a carrier via the dynamic isolator and the separation device. The satellite may be an unmanned artificial satellite such as satellite 100 or 210 described above, or in some examples may be any aerospace vehicle or technology such as an orbital telescope, extra-orbital spacecraft, space station supplies or crew, and/or interstellar probe. Method 500 may be particularly appropriate for satellites, vehicles or technology with highly vibration sensitive payload equipment and/or with limited inherent damping. For example, method 500 may be appropriate for an additively manufactured satellite having significantly reduced inherent damping.

The carrier may include any vehicle or system configured to transport the satellite from a planetary body into outer space. In particular, the carrier may be a rocket-propelled launch vehicle equipped to launch one or more satellites into orbit. Launch vehicle 124, as described above, may be one example of the carrier.

Step 512 may be performed according to optional sub-step 514, or according to optional sub-step 516. Optional sub-step 514 includes coupling the dynamic isolator to the satellite and coupling the separation device to the carrier. The separation device may be coupled to the carrier in a standard manner, according to manufacturer instructions for the separation device, and/or in a manner known to one skilled in the art of satellite launch.

Coupling the dynamic isolator to the satellite may include rigidly connecting either the retaining portion or the anchor portion of the dynamic isolator to the satellite. If the retaining portion is connected to the separation device in step 510, sub-step 514 may include coupling (e.g. connecting) the anchor portion of the dynamic isolator to the satellite. Similarly, if the anchor portion is connected to the separation device in step 510, sub-step 514 may include connecting the retaining portion to the satellite.

The dynamic isolator may be connected, fastened, and/or fixed to the satellite in any manner resulting in an effectively rigid connection. For example, the dynamic isolator may be bonded or welded to the satellite, may be mechanically linked to the satellite, and/or may be manufactured as monolithic with a component of the satellite. Fastening may be preferable, as offering a simple, inexpensive, and consistently repeatable method of rigid connection.

Optional sub-step 516 includes coupling the dynamic isolator to the carrier and coupling the separation device to the satellite. The separation device may be coupled to the satellite in a standard manner, according to manufacturer instructions for the separation device, and/or in a manner known to one skilled in the art of satellite launch.

Coupling the dynamic isolator to the carrier may include rigidly connecting either the retaining portion or the anchor portion of the dynamic isolator to the carrier. If the retaining portion is connected to the separation device in step 510, sub-step 514 may include connecting the anchor portion to the carrier. Similarly, if the anchor portion is connected to the separation device in step 510, sub-step 514 may include connecting the retaining portion to the carrier.

The dynamic isolator may be connected, fastened, and/or fixed to the carrier in any manner resulting in an effectively rigid connection. For example, the dynamic isolator may be bonded or welded to the carrier, may be mechanically linked to the carrier, and/or may be manufactured as monolithic with a component of the carrier. Fastening may be preferable, as offering a simple, inexpensive, and consistently repeatable method of rigid connection.

Steps 510-512 may be performed in the order described above, or in any desired order. For example, the separation device may first be fastened to the satellite, then the dynamic isolator may be fastened to the carrier, and finally the separation device may be fastened to the dynamic isolator. An order of these steps may be selected according to any relevant factors, including a launch schedule, manufacturing efficiency, and/or according to physical constraints imposed by the geometry of the satellite and/or carrier.

Step 518 of method 500 includes propelling the carrier into space. This step may be performed according to any effective method, including those known to one skilled in the art, such as launch phase 20 of the method described in Example A, above. For example, one or more rocket stages of the carrier may be fired, exhausted, and released. Throughout step 518, the dynamic isolator may protect the satellite from launch associated vibrations and/or other loading.

Step 520 of the method includes releasing the satellite from the carrier. This step may be performed according to any effective method, including those known to one skilled in the art, such as separation phase 30 of the method described in Example A, above. Step 520 may be performed once the carrier has attained a desired orbit, including a sufficient altitude and orbital speed.

Sub-step 522 of step 520 includes actuating the separation device. Sub-step 522 may be performed according to an established operational method of the separation device and/or according to manufacturer instructions. Actuating the separation device may include releasing clamps or springs, firing pyrotechnic components, activating motors, and/or opening a canister or other container. In some examples, actuating the separation device may include dividing the separation device in a first portion and a second portion.

Depending on whether optional sub-step 514 or optional sub-step 516 was performed, step 520 may include releasing the dynamic isolator from the satellite. That is, if the dynamic isolator is coupled to the satellite and the separation device is coupled to the carrier, then the dynamic isolator may remain connected to the satellite. However, if the dynamic isolator is coupled to the carrier and the separation device is coupled to the satellite, then the dynamic isolator may be separated from the satellite in step 520. In examples where the separation device divides into first and second portions, the first portion may remain connected to the satellite in either case.

Illustrative Combinations and Additional Examples

This section describes additional aspects and features of vibration isolation systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A vibration isolation system for coupling an object to a carrier, comprising:

a rigid retaining device having an internal space, a first external side, and a second external side, a rigid anchoring device retained in the internal space of the rigid retaining device, wherein the anchoring device has a linkage member extending from the internal space to the first external side of the retaining device and configured for rigid connection to a first apparatus, the second side of the retaining device being configured for attachment to a second apparatus, and a damping material sandwiched between the retaining device and the anchoring device configured to limit transfer of vibration between the retaining device and the anchoring device.

A1. The system of A0, wherein the first apparatus includes a separation device configured for mounting an object to a carrier during a launch phase, and releasing the object from the carrier in space.

A2. The system of A0 or A1, wherein the first apparatus includes a satellite configured for orbiting an astronomical body.

A3. The system of any of A0-A2, wherein the second apparatus includes a launch vehicle configured to carry an object from a planetary surface into space.

A4. The system of any of A0-A3, wherein the first apparatus includes a launch vehicle configured to carry an object from a planetary surface into space.

A5. The system of any of A0-A4, wherein the retaining device includes a first ring structure and a second ring structure, the anchoring device being retained between the first ring structure and the second ring structure.

A6. The system of A5, wherein the first ring structure has a circumferential protrusion, the second ring structure having a circumferential recess configured to receive the protrusion of the first ring structure.

A7. The system of A5 or A6, wherein the first ring structure includes a first aperture and second ring structure includes a second aperture aligned with the first aperture, the first and second apertures being configured to receive a fastener extending from the second apparatus.

A8. The system of any of A0-A7, wherein the anchoring device includes a third ring structure and multiple linkage members extending to the first external side of the retaining device.

A9. The system of A8, wherein the third ring structure has an external surface, the damping material substantially covering the entire external surface of the third ring structure.

A10. The system of A9, wherein the damping material surrounds each of the multiple linkage members.

A11. The system of any of A0-A10, wherein the anchoring device includes multiple segment members, each segment member connected to a linkage member extending to the first external side of the retaining device.

A12. The system of A11, wherein each segment member has an external surface, the damping material covering substantially the entire external surface of each segment member.

A13. The system of any of A0-A12, wherein one or both of the retaining device and anchoring device is comprised of laser sintered metal alloy.

A14. The system of any of A0-A13, wherein the linkage member is configured to receive a fastener extending from the first apparatus.

A15. The system of any of A0-A13, wherein one or both of (a) a thickness or (b) a hardness of the damping layer are selected according to a desired magnitude distribution of vibration disturbance of the vibration isolation system.

B0. A vibration damping system, comprising:
a vehicle,
an object, and
a coupling device connecting the object to the vehicle, including a rigid retaining device having an inner space, an anchoring device retained in the inner space of the retaining device, and a damping material sandwiched between the retaining device and the anchoring device.

B1. The system of B0, wherein the retaining device has a first external side, and a second external side, the anchoring device having a linkage member extending from the internal space to the first external side of the retaining device and configured for rigid connection to the object, the second side of the retaining device being configured for connection to the vehicle.

B2. The system of B0 or B1, wherein the vehicle is a launch vehicle configured to carry the object to space.

B3. The system of any of B0-B2, wherein the object is a satellite,

B4. The system of any of B0-B3, wherein the retaining device includes a first ring structure and a second ring structure, the anchoring device being retained between the first ring structure and the second ring structure.

B5. The system of B4, wherein the anchoring device includes a third ring structure and multiple linkage members extending to the first external side of the retaining device.

B6. The system of B5, wherein the third ring structure has an external surface, the damping material substantially covering the entire external surface of the third ring structure.

B7. The system of any of B0-B6, wherein the anchoring device includes multiple segment members, each segment member connected to a linkage member extending to the first external side of the retaining device.

B8. The system of B7, wherein each segment member has an external surface, the damping material covering substantially the entire external surface of each segment member.

B9. The system of any of B0-B8, wherein the coupling device has an effective stiffness, and the effective stiffness is selected according to a desired vibrational frequency isolation spectrum.

B10. The system of any of B0-B9, wherein the coupling device has an effective stiffness, and the effective stiffness is selected according to a natural frequency of the object.

B11 The system of any of B0-B10, wherein the coupling device has an effective stiffness, and the effective stiffness is selected according to a forcing frequency of the vehicle.

C0. A vibration isolation system for coupling a satellite to a launch vehicle, comprising:
a separation device configured for carrying a satellite in a launch vehicle during a launch phase and releasing the satellite from the launch vehicle in space, and
a vibration isolating assembly rigidly connected to the separation device, the vibration isolating assembly including:
a rigid retaining device having an internal space,
a rigid anchoring device retained in the internal space of the rigid retaining device, and
a damping material sandwiched between the retaining device and the anchoring device, configured to limit transfer of vibration between the launch vehicle and the separation device.

C1. The vibration isolation system of C0, wherein the anchoring device has a linkage member extending from the internal space of the retaining device to an external side of the retaining device.

C2. The vibration isolation system of C1, wherein the linkage member is rigidly connected to the separation device.

C3. The vibration isolation system of C1 or C2, wherein the linkage member is configured for rigid connection to the launch vehicle.

D0. A method of carrying a satellite to space, comprising:
coupling a dynamic isolator assembly to a separation device, wherein the dynamic isolator assembly includes a retaining device having an internal space, an anchoring device retained in the internal space of the retaining device, and a damping material sandwiched between the retaining device and the anchoring device, and
mounting a satellite to a carrier via the dynamic isolator and separation device.

D1. The method of D0, wherein the retaining device includes a first ring structure and a second ring structure, the anchoring device being retained between the first ring structure and the second ring structure.

D2. The system of D1, wherein the anchoring device includes a third ring structure and multiple linkage members extending from the internal space to a first external side of the retaining device.

D3. The system of D2, wherein the third ring structure has an external surface, the damping material substantially covering the entire external surface of the third ring structure.

D4. The system of D2 or D3, wherein the damping material surrounds each of the multiple linkage members.

D5. The method of any of D0-D4, wherein the mounting step includes connecting the separation device to the satellite.

D6. The method of any of D0-D5, further comprising: propelling the carrier to space, and releasing the satellite from the carrier.

D7. The method of D6, wherein:
releasing the satellite from the carrier includes actuating the separation device.

D8. The method of any of D0-D7, further including selecting one or both of (a) a geometry or (b) a stiffness of the damping material to tune a frequency distribution of vibrations absorbed by the dynamic isolator assembly.

E0. A vibration isolation system for coupling an object to a carrier, comprising:
a rigid retaining device having a first internal space, a first external side, and a second external side,
a rigid anchoring device retained in the first internal space of the rigid retaining device, wherein the anchoring device has a linkage portion extending from the first internal space to the first external side of the retaining device and configured for rigid connection to a first apparatus, the second side of the retaining device being configured for attachment to a second apparatus, and
a damping material sandwiched between the retaining device and the anchoring device configured to limit transfer of vibration between the retaining device and the anchoring device.

E1. The system of E0, wherein the anchoring device has a foot portion connected to the linkage portion, the foot portion having an external surface, the damping material covering substantially the entire external surface of the foot portion.

E2. The system of E1, wherein the damping material covers the external surface of the foot portion and surrounds the linkage portion.

E3. The system of E1 or E2, wherein the foot portion includes an arc shaped segment member.

E4. The system of any of E0-E3, wherein the anchoring device includes multiple foot portions, each foot portion retained in an internal space of the retaining device and connected to a linkage portion extending from the internal space to the first side of the retaining device.

E5. The system of E4, wherein each of the foot portions and respective linkage portions are substantially covered by the damping material.

E6. The system of E5, wherein the first internal space is a circular space inside the retaining device, each of the foot portions being retained in the first internal space.

Advantages, Features, and Benefits

The different examples of the vibration isolation system described herein provide several advantages over known solutions for limiting transfer of vibration. For example, illustrative examples described herein allow effective damping of high amplitude vibration in axial, shear, and bending modes.

Additionally, and among other benefits, illustrative examples described herein allow safe launch of apparatus with little to no inherent damping, such as additively manufactured satellites.

Additionally, and among other benefits, illustrative examples described herein allow configuration compatible with existing launch vehicle and separation system mounting hardware.

Additionally, and among other benefits, illustrative examples described herein allow tuning across a wide range of stiffness by variation of design geometry and/or material specifications.

Additionally, and among other benefits, illustrative examples described herein allow straightforward manufacturing with a minimal part count.

Additionally, and among other benefits, illustrative examples described herein are strong and light, in a compact envelope.

No known system or device can perform these functions, particularly in launch conditions. Thus, the illustrative examples described herein are particularly useful for satellites. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A vibration isolation system for coupling an object to a carrier, comprising:
a rigid retaining device having an internal space, a first external side, and a second external side, formed by a first ring structure and a second ring structure,
a rigid anchoring device which includes a third ring structure retained in the internal space of the rigid retaining device, between the first ring structure and the second ring structure, wherein:
the anchoring device has multiple linkage members extending from the internal space to the first external side of the retaining device and configured for rigid connection to a first apparatus, and
the second side of the retaining device is configured for attachment to a second apparatus, and
a damping material sandwiched between the retaining device and the anchoring device configured to limit transfer of vibration between the retaining device and the anchoring device.

2. The vibration isolation system of claim 1, wherein the first apparatus includes a separation device configured for mounting an object to a carrier during a launch phase, and releasing the object from the carrier in space.

3. The vibration isolation system of claim 1, wherein the first apparatus includes a satellite configured for orbiting an astronomical body.

4. The vibration isolation system of claim 1, wherein the second apparatus includes a launch vehicle configured to carry an object from a planetary surface into space.

5. The vibration isolation system of claim 1, wherein the first ring structure has a circumferential protrusion, the second ring structure having a circumferential recess configured to receive the protrusion of the first ring structure.

6. The vibration isolation system of claim 1, wherein the first ring structure includes a first aperture and the second ring structure includes a second aperture aligned with the first aperture, and the first and second apertures are configured to receive a fastener extending from the second apparatus.

7. The vibration isolation system of claim 1, wherein the third ring structure has an external surface, the damping material substantially covering the entire external surface of the third ring structure.

8. The vibration isolation system of claim 7, wherein the damping material surrounds each of the multiple linkage members.

9. The vibration isolation system of claim 1, wherein the anchoring device includes multiple segment members, each segment member connected to a linkage member extending to the first external side of the retaining device.

10. The vibration isolation system of claim 1, wherein one or both of the retaining device and anchoring device is comprised of laser sintered metal alloy.

11. The vibration isolation system of claim 1, wherein the linkage member is configured to receive a fastener extending from the first apparatus.

12. A vibration isolation system for coupling a satellite to a launch vehicle, comprising:
- a separation device configured for carrying a satellite in a launch vehicle during a launch phase and releasing the satellite from the launch vehicle in space, and
- a vibration isolating assembly rigidly connected to the separation device, the vibration isolating assembly including:
  - a rigid retaining device having an internal space,
  - a rigid anchoring device, including a footing portion retained in the internal space of the rigid retaining device and multiple linkage members extending from the internal space of the retaining device to an external side of the retaining device, and
  - a damping material sandwiched between the retaining device and the anchoring device, configured to limit transfer of vibration between the launch vehicle and the separation device, wherein the damping material covers substantially an entire external surface of the footing portion.

13. The vibration isolation system of claim 12, wherein the linkage member is rigidly connected to the separation device.

14. A method of carrying a satellite to space, comprising:
coupling a dynamic isolator assembly to a separation device, wherein:
- the dynamic isolator assembly includes a retaining device having an internal space, an anchoring device retained in the internal space of the retaining device, and a damping material sandwiched between the retaining device and the anchoring device,
- the retaining device includes a first ring structure and a second ring structure,
- the anchoring device is retained between the first ring structure and the second ring structure, and
- the anchoring device includes a third ring structure and multiple linkage members extending from the internal space to a first external side of the retaining device, and mounting a satellite to a carrier via the dynamic isolator and separation device.

15. The method of claim 14, wherein
the third ring structure has an external surface, the damping material substantially covering the entire external surface of the third ring structure.

16. The method of claim 14, wherein the mounting step includes connecting the separation device to the satellite.

17. The method of claim 14, further comprising:
propelling the carrier to space, and
releasing the satellite from the carrier.

18. The vibration isolation system of claim 1, wherein the rigid retaining device is connected to the rigid anchoring device only through the damping material.

19. The vibration isolation system of claim 1, wherein each linkage member is centered relative to an annular extent of the third ring.

20. The vibration isolation system of claim 12, wherein the rigid retaining device is formed by a first ring structure and a second ring structure, and footing portion of the rigid anchoring device is a third ring structure retained between the first ring structure and the second ring structure.

* * * * *